(12) United States Patent
Thompson et al.

(10) Patent No.: US 7,438,184 B2
(45) Date of Patent: Oct. 21, 2008

(54) CONTROLLED-ENVIRONMENT PACKAGE FOR LIMITED-PLAY OPTICAL DISC

(75) Inventors: Robert F. Thompson, Kennebunk, ME (US); Yannis Bakos, New York, NY (US)

(73) Assignee: Flexplay Technologies, Inc., Atlanta, GA (US)

( * ) Notice: Subject to any disclaimer, the term of this patent is extended or adjusted under 35 U.S.C. 154(b) by 0 days.

(21) Appl. No.: 10/162,417

(22) Filed: Jun. 4, 2002

(65) Prior Publication Data

US 2003/0213710 A1    Nov. 20, 2003

Related U.S. Application Data

(60) Provisional application No. 60/380,370, filed on May 14, 2002.

(51) Int. Cl.
*B65D 85/57* (2006.01)
*B65D 85/84* (2006.01)

(52) U.S. Cl. .................. 206/308.1; 206/524.4

(58) Field of Classification Search ............. 206/308.1, 206/307, 213.1, 205, 404, 484.1, 484.2, 524.1, 206/524.2, 524.4, 524.6, 484; 369/286, 291; 428/35.2–35.4
See application file for complete search history.

(56) References Cited

U.S. PATENT DOCUMENTS

| | | | |
|---|---|---|---|
| 4,677,604 A | 6/1987 | Selby, III et al. | |
| 5,400,319 A | 3/1995 | Fite et al. | |
| 5,538,773 A | 7/1996 | Kondo | |
| 5,572,589 A | 11/1996 | Waters et al. | |
| 5,587,984 A | 12/1996 | Owa et al. | |
| 5,598,399 A | 1/1997 | Ogihara et al. | |
| 5,608,717 A | 3/1997 | Ito et al. | |
| 5,644,566 A | 7/1997 | Nakayama et al. | |
| 5,661,703 A | 8/1997 | Moribe et al. | |
| 5,671,202 A | 9/1997 | Brownstein et al. | |
| 5,681,633 A | 10/1997 | Onagi et al. | |
| 5,700,554 A * | 12/1997 | Speer et al. | ................. 428/220 |
| 5,815,484 A | 9/1998 | Smith et al. | |

(Continued)

FOREIGN PATENT DOCUMENTS

WO    WO 98/11539    3/1998

(Continued)

OTHER PUBLICATIONS

PCT Notification of Transmittal of International Search Report for PCT/US02/17906.

*Primary Examiner*—J. Gregory Pickett
(74) *Attorney, Agent, or Firm*—Morris, Manning & Martin, LLP

(57) ABSTRACT

Limited play optical discs (LPOD's) are optical discs readable by a reading device for a limited period of time. After removal from it's packaging, an LPOD becomes unusable after a relatively short period of time. LPOD's can be provided with a limited shelf life by storing the LPOD's in a special package. The packaging includes a portion that controls the environment inside the package until a preset period of time passes, at which point reading-inhibit action of a material in the optical disc is allowed to go forward, which causes the disc to become unreadable. Hence, once the product exceeds its shelf life, it becomes unusable regardless of whether or not the package has been opened.

25 Claims, 3 Drawing Sheets

U.S. PATENT DOCUMENTS

| | | |
|---|---|---|
| 6,011,772 A | 1/2000 | Rollhaus et al. |
| 6,161,106 A | 12/2000 | Dailey et al. |
| 6,228,440 B1 | 5/2001 | Dailey et al. |
| 6,309,496 B1 | 10/2001 | Van Hoof et al. |
| 6,340,555 B1 | 1/2002 | Miyamoto et al. |
| 6,343,063 B1 | 1/2002 | Rollhaus et al. |
| 6,523,683 B1 * | 2/2003 | Fraser et al. ............. 206/308.1 |
| 2002/0172143 A1 * | 11/2002 | Lawandy et al. ............ 369/292 |
| 2003/0123380 A1 * | 7/2003 | Waldman et al. ......... 369/275.4 |

FOREIGN PATENT DOCUMENTS

| | | |
|---|---|---|
| WO | WO 98/41979 | 9/1998 |
| WO | WO 99/41738 | 8/1999 |
| WO | WO 99/67085 | 12/1999 |

* cited by examiner

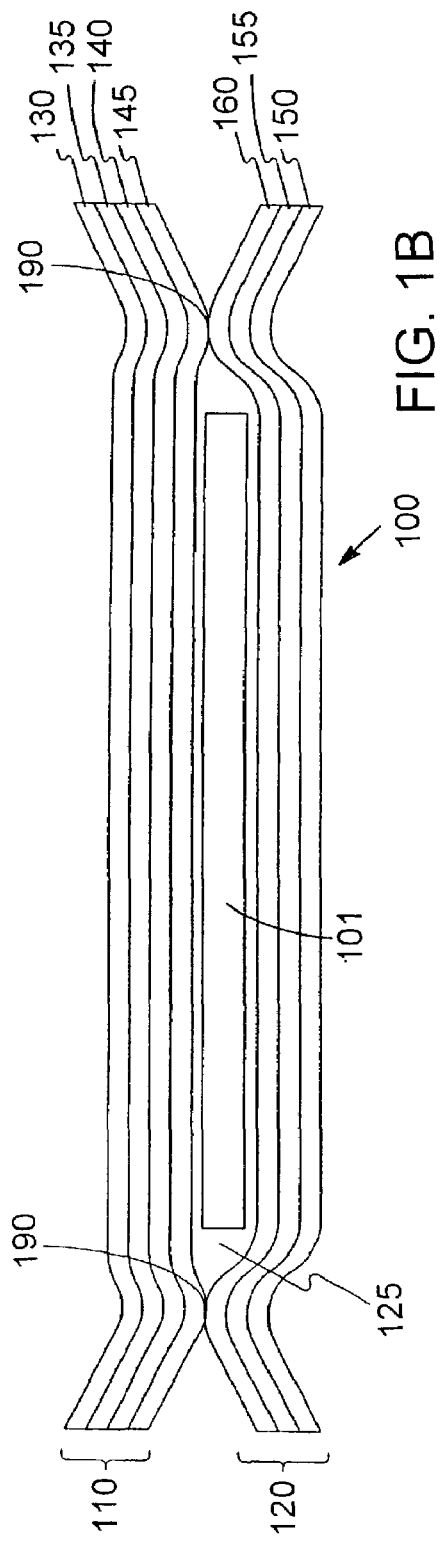
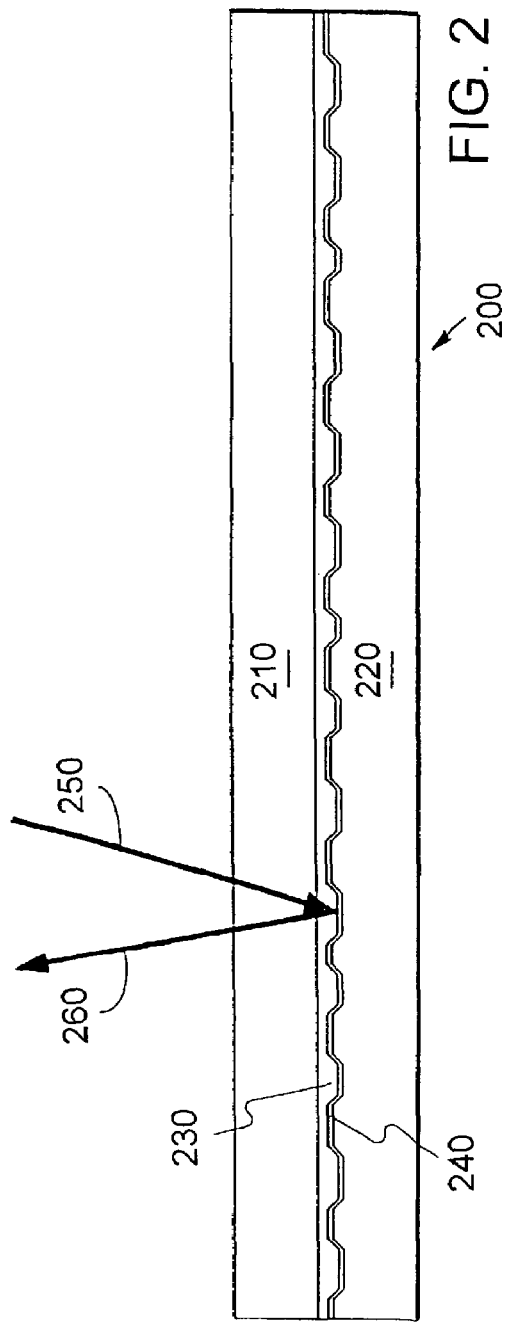

CONTROLLED-ENVIRONMENT PACKAGE FOR LIMITED-PLAY OPTICAL DISC

CLAIM OF PRIORITY

This application claims priority under 35 USC §119(e) to Provisional Patent Application No. 60/380,370, entitled "Controlled-Environment Package for Limited-Play Optical Disc" filed on May 14, 2002, the entire contents of which are hereby incorporated by reference.

TECHNICAL FIELD

This invention relates to optical discs, and more particularly to limited-play optical discs.

BACKGROUND

The advent of digital optical discs has brought several products to market for the recording, storage, and playback of various forms of digital information. These include products sold into the computer, audio and video markets. The rapid adoption of audio compact discs was first to establish the optical disc format as a consumer media. The compact disc was followed by CD-ROM's and CD-R's in the computer market, and Video-CD's and DVD's in the video markets. The recent success of DVD in the video markets, and accompanying adoption of DVD players by consumers, has also created demand for DVD rentals. Typically, rentals require a consumer to visit the rental location to rent, and subsequently return, the DVD within an agreed rental period. Usually, the rental store fines the consumer if the DVD is not returned within the agreed rental period. While making several trips to a rental store is typically an inconvenience to a customer, this is one of the few cost-effective ways of making, e.g., a home movie accessible to a customer for a limited time.

SUMMARY

Another way of making a home movie available to a customer for a limited time is with limited-play optical discs (LPOD's). LPOD's are optical discs readable by a reading device for a limited period of time. After removal from it's packaging, an LPOD becomes unusable after a relatively short period of time, e.g., a few hours, days, weeks, or even months. The inventors have discovered that some LPOD's can be provided with a limited shelf life by modifying the LPOD and LPOD packaging. The limited shelf life is accomplished by packaging the disc in a special film that controls the environment inside the package until a preset period of time passes, at which point reading-inhibit action of a material in the optical disc is allowed to go forward, which causes the disc to become unreadable. Hence, once the product exceeds its shelf life, it becomes unusable regardless of whether or not the package has been opened.

In a first aspect, the invention features a packaged product including an optical disc storing information and including a region of reactive material that reacts with a first reagent (e.g., oxygen) by switching from a read-permitting state to a read-inhibiting state, the read-inhibiting state preventing at least some of the information stored on the disk from being accessed. The packaged product also includes a sealed package defining a sealed internal cavity which holds the optical disc, the package including a scavenger material that scavenges the first reagent that is within the sealed internal cavity. At least a portion of the sealed package is permeable to the first reagent.

Implementations of the packaged product can include one or more of the following features.

The sealed package can include a first film that forms a first wall of the sealed package. The first film can include the scavenger material. The first film can be a multilayer film and a layer of the multilayer film can include the scavenger material. The multilayer film can include an outer layer and the scavenger layer can be located between the outer layer and the sealed internal cavity. The multilayer film can include an inner layer located between the scavenger layer and the sealed internal cavity. The first film can include an organic polymer.

The sealed package can include a second film (e.g., a multilayer film) that forms a second wall of the sealed package. The second film can be bonded to the first film by an edge seal. The second film can have a first reagent transmission rate of less than 5 cc/m$^2$/24 hr (e.g., less than 1 cc/m$^2$/24 hr). The second film can include an organic polymer.

The scavenger material can have a finite capacity for scavenging the first reagent, and when the capacity is exhausted the scavenger material ceases to scavenge the first reagent that is within the sealed internal cavity.

The scavenger material can be located within the sealed internal cavity.

In another aspect, the invention features a packaged product, including a limited play optical disc including a read-inhibiting material, and a container enclosing the limited play optical disc which prevents the read-inhibiting material from changing to a read-inhibiting state for a preset time period.

Implementations of the packaged product can include one or more of the following features.

The read-inhibiting material can react with a first reagent thereby switching from a read-permitting state to a read-inhibiting state, the read-inhibiting state preventing at least some of the information stored on the disk from being accessed. The container can define a sealed internal cavity, and the limited play optical disc can be located inside the sealed internal cavity. The container can include a scavenger material that scavenges the first reagent that is within the sealed internal cavity during the preset time period. The scavenger material can cease to scavenge the first reagent after the preset time period.

The container can include a first wall, and the first wall can include the scavenger material. The first wall can include a multilayer film, and at least one of the layers of the multilayer film can include the scavenger material.

The preset time period can be less than one year, about one year, or greater than one year.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 1B is a cross-sectional view of the controlled-environment package CEP shown in FIG. 1A with the LPOD inside;

FIG. 2 is a cross-sectional view showing the structure of an LPOD;

Like reference symbols in the various drawings indicate like elements.

DETAILED DESCRIPTION

Figure 1A:
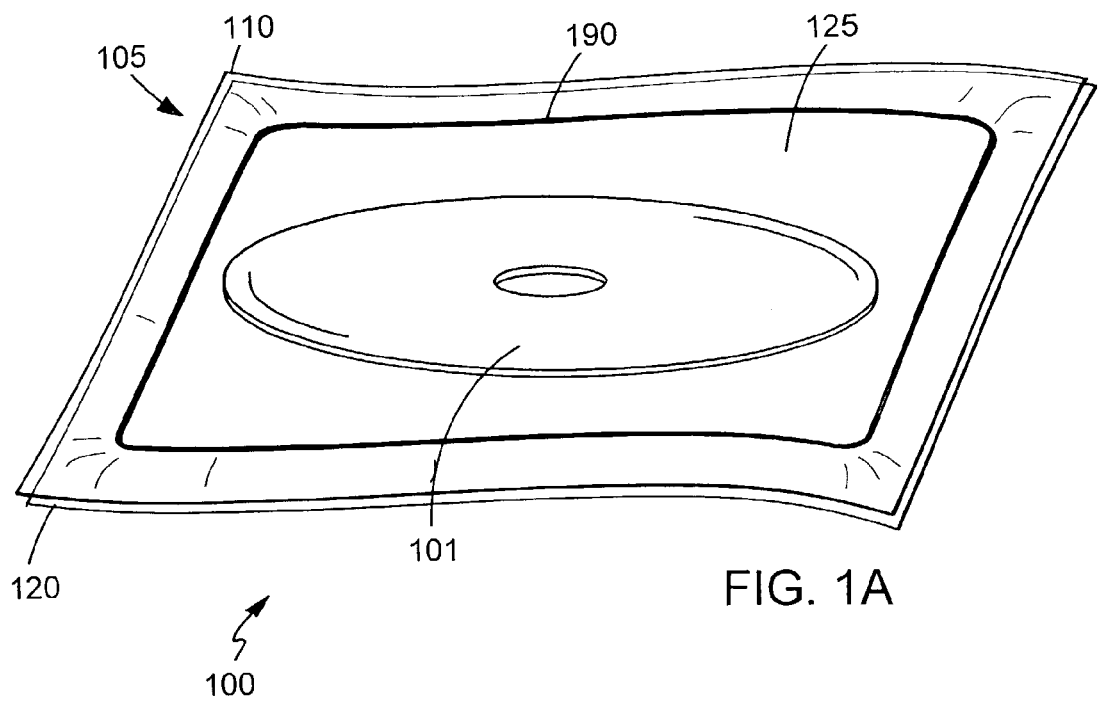
FIG. 1A illustrates a limited-play optical disc (LPOD) in a controlled-environment package (CEP)

Referring to FIGS. 1A and 1B, a packaged product 100 includes a limited play optical disc (LPOD) 101 sealed inside a controlled environment package (CEP) 105. CEP 105 controls the environment of LPOD 101 to prevent a read-inhibiting material in LPOD 101 from causing the disc to become unreadable until after packaged product 100 has been opened or until the packaged product 100 exceeds its shelf life.

CEP 105 includes two multilayer films 110 and 120 that form an internal cavity 125, inside which LPOD 101 is placed. A hermetic edge seal 190 between the inner surfaces of films 110 and 120 seals internal cavity 125. Internal cavity 125 is slightly larger than LPOD 101, providing "head space" for the disc inside the package. By controlling and manipulating the composition of the gases in cavity 125, CEP 105 inhibits activation of a read-inhibiting mechanism in LPOD 101 until the expiration of a preset period corresponding to the shelf life of packaged product 100. Once the shelf life is exceeded, CEP 105 allows the disc environment to change, which in turn allows the read-inhibiting action of the material in the LPOD to go forward.

The top web, multilayer film 110 scavenges residual oxygen from internal cavity 125 by chemically reacting with oxygen, forming water as a byproduct. This creates an oxygen-free environment for LPOD 101. Although multilayer film 110 contains an oxygen scavenger, it is not a physical oxygen barrier film. Rather, multilayer film 110 is actually permeable to oxygen, but absorbs oxygen diffusing into the film. Once the oxygen scavenger saturates, the film stops absorbing oxygen and allows oxygen to diffuse through. The relationship between the oxygen-scavenging function of multilayer film 110 and the shelf life of the packaged product is described in detail below.

In the described embodiment, film 110 is a 3.6 mil thick co-extruded, multilayer film that includes an outer layer 130, and three inner layers 135, 140, and 145. Outer layer 130 is a saran-coated polyester layer, which acts as an "abuse" layer, protecting the product from abrasion and handling while also acting as a water barrier. Layer 135 is a polypropylene layer that provides a relatively inexpensive way to add some bulk to multilayer film 110. Layer 140 is a scavenger layer that includes an oxygen scavenging material. Layer 145 is a low density polyethylene sealant layer, which has a relatively low melting point compared to the other layers. The low melting point means that a heat sealer can easily bond layer 145 to multilayer film 120, hermetically-sealing cavity 125. An example of a commercially available "oxygen scavenger" film which is usable as film 110 is OS1000, available from Cryovac (Duncan, S.C.).

The bottom web, multilayer film 120, is a co-extruded, multilayer film that includes an outer layer 150, and inner layers 155 and 160. Multilayer film 120 has a relatively low oxygen transmission rate compared to multilayer film 110 and effectively prevents significant amounts of ambient oxygen from diffusing into internal cavity 125 prior to the oxygen scavenger saturating. The low oxygen transmission rate is due to layer 155, which is an ethylene vinyl alcohol (EVOH) oxygen-barrier layer. Since these barrier properties degrade upon exposing the layer to moisture, outer layer 150 is formed from a material having good water barrier properties, such as polypropylene. Outer layer 150 also protects inner layers 155 and 160 from abrasion. Layer 160 is a low density polyethylene sealant layer. A heat seal bonds this sealant layer to sealant layer 145 of film 110. An example of such a film is film T6070B, also available from Cryovac.

Before describing how CEP 105 controls the environment of LPOD 101 to give the product a finite shelf life, we will describe how the read-inhibiting mechanism of LPOD 101 functions. In the following description, we use leuco methylene blue (LMB) to provide the read-inhibiting function, though other materials will also provide that function. Some other read-inhibiting materials are brilliant cresyl blue, basic blue 3, and Toluidine 0.

Referring to FIG. 2, a LPOD includes a pair of transparent, plastic substrates 210 and 220, which are bonded together by a layer of an adhesive material, interstitial layer 230. The read-inhibiting material, LMB, is included with the adhesive material in interstitial layer 230. The inner surface of substrate 220 is patterned with a number of "pits," which are small depressions in the substrate surface. The areas between the pits are known as "lands." This patterned surface is coated with a reflective coating, shown as reflective layer 240. Typically, this coated layer is a sputtered metal layer, such as an aluminum layer. Reflective layer 240 conforms to the pits and lands, which provide the basis for digital information stored on the disc.

During the discs operating life, the adhesive material (e.g., an acrylate resin) used to form interstitial layer 230 is optically transparent. Accordingly, substrate 240 and interstitial layer 230 transmit a reading laser beam 250 incident on that side of the disc to reflective layer 240, which reflects a signal laser beam 260 toward a sensor in a reading device (not shown). The intensity of the reflected laser beam 260 is different for the pits and the lands due to a wave cancellation effect. The reading device detects these differences in reflectivity and thereby accesses or reads the digital information stored on the disc.

Upon exposure to oxygen, LMB is oxidized to form methylene blue (MB). MB is a compound that appears deep blue and absorbs light in the 630 nm to 670 nm wavelength range, which encompasses the operating wavelength of the reading lasers of most current DVD devices. Once a sufficient amount of oxygen diffuses through substrate 210 to oxidize the LMB, interstitial layer 230 changes from a transparent state to an opaque state thereby preventing the laser from reading the stored data. In an environment having atmospheric oxygen levels, the disc becomes unreadable after a predetermined time based on oxygen permeability of the materials used. The LPOD can be engineered to have any usable lifetime, and is typically in the 24-72 hour range.

In this particular example, LMB is provided initially in a blocked form (e.g., as triisopropylsilyloxycarbonylleucomethylene blue (TLMB)). In other words, the compound included in the adhesive material at the time of manufacturing of the disc is not immediately oxidizable in the presence of oxygen to form methylene blue. TLMB needs to be unblocked to form oxidizable LMB. TLMB is unblocked by chemically reacting with water, which is provided by moisture in air. In fact, TLMB is stable for several months in the presence of oxygen. Thus, the acrylate-based coating resin which contains TLMB and is used to form interstitial layer 230 can be handled in the presence of oxygen until the deblocking reaction has taken place. The deblocking reaction occurs slowly enough that the handling of the coating fluid during disc manufacture can be done in normal (undried) air without causing the LMB to prematurely oxidize.

In the case of the described embodiment, in order to provide the disc with a limited shelf life, the disc packaging provides an environment that first deblocks the read-inhibiting material in the disc, and then changes the environment to cause the read-inhibiting material to change to its read-inhibiting state. We will now describe how CEP 105 (see FIG. 1B) performs these functions.

A small amount of air is sealed with LPOD 101 inside internal cavity 125 at time of packaging. However, at this time, the read-inhibiting material is in blocked form so latent oxygen present in the package does not react with the read-inhibiting material. Once packaged, the oxygen scavenger layer 140 scavenges residual oxygen from cavity 125. This causes the oxygen dissolved in the disc to out gas into the internal cavity. Layer 140 also scavenges this oxygen. Hence, a certain time after packaging (e.g., a few minutes to days) the disc and its environment is substantially free of oxygen. That is, there is insufficient oxygen present in the package to cause the deblocked read-inhibiting material to convert to its read-inhibiting state.

A certain time period after packaging, water deblocks the read-inhibiting material, sensitizing it to oxygen. This time period is longer than the time it takes for the oxygen scavenger to make the disc environment substantially oxygen free. Water for deblocking TLMB comes from the water vapor in the air sealed inside internal cavity 125 at the time of packaging, and from water dissolved in the acrylate formulation used in the interstitial layer of LPOD 101, as well as residual water absorbed in the substrates. Additionally, the oxygen scavenger layer 140 provides water to the internal cavity 125. This water deblocks the TLMB in a hydrolysis reaction to form oxidizable LMB. As there is no oxygen present in the disc's environment to oxidize the read-inhibiting agent, the disc remains in a readable state until either a consumer opens the package, or the scavenger is exhausted and no longer scavenges the oxygen entering the package.

When a consumer opens the disc package, the oxygen level of the disc environment instantly changes to that of the ambient air. This atmospheric oxygen diffuses through the disc substrates and into the interstitial layer of the disc, initiating the oxidation reaction that changes the state of the read-inhibiting material. Accordingly, after a predetermined period to being exposed to air, the disc becomes unreadable by a reading device.

After a preset period of time, the package exceeds its shelf life. This occurs because the multilayer films 110 and 120 are permeable to oxygen. Oxygen continuously diffuses from the surrounding atmosphere into multilayer film 110. Additionally, oxygen diffuses through multilayer film 120 into internal cavity 125. This oxygen is scavenged by the oxygen scavenger until the oxygen scavenger's capacity is exhausted. Once this capacity is exhausted, oxygen diffuses through both multilayer films 110 and 120, increasing the oxygen levels in internal cavity 125. As the oxygen levels in internal cavity increase, oxygen diffuses through the LPOD substrates and into the interstitial layer containing the LMB. Thus, oxidation of the LMB occurs while the disc is in the unopened package. In the case of the described embodiment which uses OS1000 and T6070B, the oxygen transmission rate for the films are 6.5 cc/m$^2$/24 hrs and 2 cc/m$^2$/24 hrs, respectively (at 23° C., 0% RH). OS1000 has an oxygen scavenging capacity of 800 cc/m$^2$.

The present embodiment has a designed shelf life of approximately one year, although, in general, the shelf life can be shorter or longer than one year. For example, the shelf life of the package can be six months or less. Alternatively, the shelf life can be two years or more. A number of factors influence the shelf life, including the construction of the package itself, the storage conditions, and the nature of the read-inhibiting material and disc construction.

A manufacturer can select several parameters of the package itself to provide a desired shelf life. These parameters include the efficacy of water and/or oxygen barrier layers. For example, if layer 150 is formed from a material that has poorer water barrier properties than in the described embodiment, then ambient moisture will more rapidly degrade oxygen barrier layer 155. Accordingly, oxygen barrier layer 155 will fail sooner than for the described embodiment and the package's shelf life will be shorter than one year.

A manufacturer can also select the capacity of the oxygen scavenger to provide a shorter or longer shelf life than the described embodiment. In general, the larger the oxygen scavenger capacity is the longer the package's shelf life will be.

The oxygen transmission rate of the films in the CEP also influences the shelf life of the package. A higher oxygen transmission rate for one or both of the films will cause the oxygen scavenging capacity of the scavenger layer to be exhausted sooner, shortening the shelf life. Conversely, selecting films with a lower oxygen transmission rate will lengthen a package's shelf life.

Environmental factors also influence the shelf life. For example, a warm, humid storage environment is likely to result in a shorter shelf life than a cool, dry environment. More generally, any external environmental parameter that influences rate of diffusion of oxygen and/or water into the package, and/or the time it takes for the scavenger layer to saturate and/or oxygen barrier to deteriorate, is a parameters that affects the shelf life.

Figure 4:
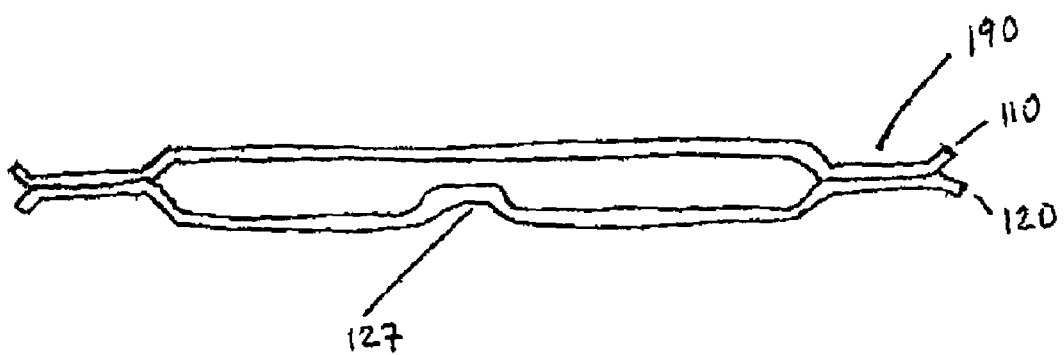
FIG. 4 is a cross-sectional view showing the controlled environment package (without a disc) with a protrusion for holding the LPOD in place in the controlled environment package.

In the described embodiment, the LPOD has a small amount of headspace in internal cavity 125, and can shift around inside the cavity. Optionally, as shown in FIG. 4, a protrusion 127 can be provided inside the CEP to prevent unwanted shifting of the disc within the package. An LPOD centers onto this protrusion 127, and is subsequently held in place inside the CEP. Alternatively, the LPOD can be vacuum-packed inside the CEP, in which case it fits conformally to the disc and there is no headspace. Vacuum packing also provides a slightly more compact product with increased rigidity and stiffness.

To facilitate easy opening of the package by a user, a release agent can be provided on the inner surface of one or both of multilayer films 110 and 120. Release agents can be laminated or coated onto the multilayer films. For example, a release agent coating (e.g., a silicone release agent coating) can be applied to layer 160 prior to sealing the CEP. In general, any release agent can be used provided the release agent does not adversely affect the shelf life of the packaged product (e.g., by corrupting the integrity of seal 190, a release liner could cause oxygen to diffuse into cavity 125 at a higher rate than expected, thereby shortening the shelf life of the product). The selection of sealing surfaces can also be designed to allow stress points that assist in the initiation of the pull force necessary to overcome the seal strength. Specifically, a package can have a corner or fold that is not sealed, effectively reducing the seal width or area on the package. This allows a consumer to grip a portion of both films and pull apart the package.

While the described embodiment refers to specific polymers for the different layers in films 110 and 120, other materials can also be used. Examples of other organic polymers include cellulose acetate, nitrile, polycarbonate, polyester, polystyrene, polyvinyl chloride, and cyclo olefin Copolymers. One could also use inorganic materials with appropriately selected properties. For example, aluminum provides excellent oxygen and water vapor barrier properties (a one mil thick aluminum film is impermeable to moisture and oxygen), and can be used in place of multilayer film 120 in package 100. In general, a manufacturer can select the composition and thickness of each film to optimize shelf life and additional parameters, such as mechanical properties (e.g., stiffness, warpage and tear strength) and cost.

Figure 3:
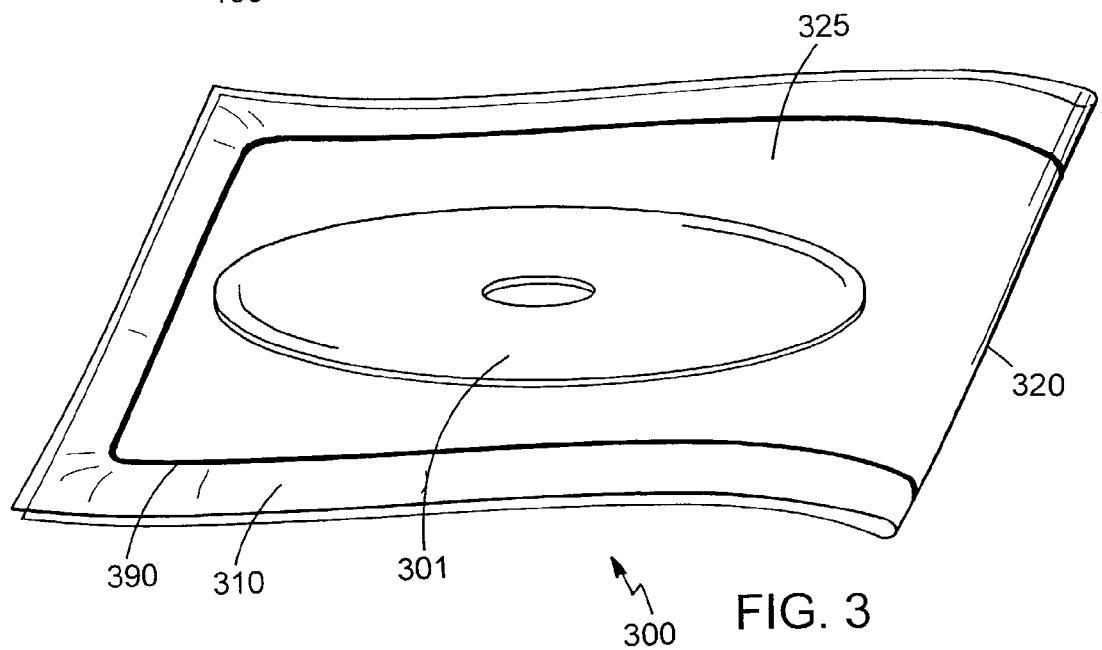
FIG. 3 is a perspective view of another embodiment of the combination of an LPOD and CEP.

While in the described embodiment the CEP is constructed with two films, sealed together around the edge of the LPOD, other types of packaging is also possible. As illustrated in FIG. 3, for example, instead of two separate films, a CEP 300 can be made from a single film 310. The single film 310 is folded over a LPOD 301 at edge 320. CEP 300 is then sealed 390 on three sides to provide an enclosed cavity 325 for LPOD 301.

More generally, CEP's are not limited to envelope-type packages, such as the embodiments described above. CEP's can be any type of packaging that provides a limited shelf life for a LPOD. In some embodiments, the CEP is a jewel case, such as those commonly used for packaging audio compact discs. A strip of adhesive tape can be used to seal the edge of the case. Moreover, while in the foregoing embodiments the oxygen scavenger is a layer in a multilayer film, the oxygen scavenger can be provided in other forms and in other locations. For example, the oxygen scavenger can be provided as a sachet that sits inside the package cavity with the disc. In general, the oxygen scavenger can be in any form sufficient to control the amount of oxygen diffusing into the disc and/or package.

A number of embodiments of the invention have been described. Nevertheless, it will be understood that various modifications may be made without departing from the spirit and scope of the invention. For example, provided the disc remains readable for the shelf life of the package, the disc can be packaged with the read-inhibiting material in unblocked form. To accomplish this, the disc can be packaged in an inert atmosphere, e.g., a nitrogen atmosphere. Moreover, the read-inhibiting material can be sensitive to reagents and/or stimuli other than oxygen. For example, the read-inhibiting material can be sensitive to moisture or laser radiation. Accordingly, other embodiments are within the scope of the following claims.

What is claimed is:

1. A packaged product comprising:
   an optical disc storing information, said optical disc having a reactive material that reacts in the presence of oxygen to render the information, stored on the optical disc unreadable;
   a sealed package defining a sealed internal cavity which envelops the optical disc, wherein at least one side of said sealed package comprises a film;
   a protrusion formed in the least one side of said sealed package for securing said optical disc within said sealed package; and
   a scavenger material included in said sealed package, said scavenger material scavenges oxygen that diffuses into, the sealed package after the package has been sealed, wherein the scavenger material is adapted to saturate after a preset period of time;
   wherein oxygen reacts with said reactive material once the scavenger material saturates thereby rendering the information stored on the optical disc unreadable while the optical disc is still within said sealed package.

2. The packaged product of claim 1, wherein said at least one side of said sealed package is a multilayer film and a layer of the multilayer film includes the scavenger material.

3. The packaged product of claim 2, wherein the multilayer film comprise an outer layer and the scavenger layer is located between the outer layer and the sealed internal cavity.

4. The packaged product of claim 2, wherein the multilayer film comprises an inner layer located between the scavenger layer and the sealed internal cavity.

5. The packaged product of claim 1, wherein said film comprises an organic polymer.

6. The packaged product of claim 1, wherein the sealed package comprises a second film that forms a second wall of the sealed package.

7. The packaged product of claim 6, wherein the second film is bonded to the first film by an edge seal.

8. The packaged product of claim 7, wherein the second film is a multilayer film.

9. The packaged product of claim 6, wherein the second film has an oxygen transmission rate of less than 5 $cc/m^2/24$ hr.

10. The packaged product of claim 6, wherein the second film comprises an organic polymer.

11. The packaged product of claim 1, wherein the scavenger material has a finite capacity for scavenging the first reagent, and when the capacity is exhausted the scavenger material ceases to scavenge the first reagent that is within the sealed internal cavity.

12. The packaged product of claim 1, wherein the scavenger material is located within the sealed internal cavity.

13. The packaged product of claim 1, wherein the preset period of time is less than one year.

14. The packaged product of claim 1, wherein the preset period of time is about one year.

15. The packaged product of claim 1, wherein the preset period of time is greater than one year.

16. A method for selectively limiting the shelf life of an optical disc, the optical disc having a reactive material incorporated therein, wherein the reactive material oxidizes in the presence of a sufficient amount of oxygen and wherein the oxidation renders the optical disc unreadable, and wherein the reactive material incorporated into the optical disc is not reactive with oxygen until it has first been exposed to water, the method comprising the steps of:
   providing a packaging material having a multilayer film wherein at least a portion of the packaging material is permeable to oxygen;
   selecting a scavenger material wherein the scavenger material is adapted to scavenge oxygen until it reaches a saturation maximum and wherein the scavenger material is selected based on the shelf life desired for the optical disc;
   incorporating the scavenger material into the packaging material;
   shaping the packaging material to envelop the optical disc;
   placing the optical disc within the envelope formed by the shaped packaging materials; and
   sealing the envelope with the optical disc enclosed therein, wherein the reactive material is initially exposed to water within the sealed envelope as a byproduct of the scavenger material scavenging oxygen, whereby the optical disc remains readable only for a predetermined period of time within the sealed envelope based on the selected scavenger material and its saturation maximum.

17. The method of claim 16 wherein the scavenger material is incorporated into a layer of the multilayer film.

18. The method of claim 17 wherein the scavenger material scavenges oxygen within the layer of the multilayer film and before the oxygen reaches the optical disc.

19. The method of claim 16 wherein the scavenger material is selected based, at least, in part, on the amount of space created within the sealed envelope.

20. The method of claim 16 wherein the scavenger material is selected based, at least in part, on the oxygen permeability of the packaging material.

21. The method of claim 16 wherein the scavenger material is selected based, at least in part, on the water permeability of the packaging material.

22. The method of claim 16 wherein oxygen diffuses into the sealed envelope after the scavenger material reaches its saturation maximum.

23. The method of claim 16 wherein the step of selecting the scavenger material includes, selecting an amount of scavenger material based upon the desired shelf life of the optical disc.

24. The method of claim 16 wherein the step of selecting the scavenger material includes selecting a type of scavenger material based upon the desired shelf life of the optical disc.

25. A packaged optical disc product produced according to the method of claim 16.

* * * * *